United States Patent
Nagarajan et al.

(10) Patent No.: US 9,496,959 B1
(45) Date of Patent: Nov. 15, 2016

(54) PHOTONIC TRANSCEIVING DEVICE PACKAGE STRUCTURE

(71) Applicant: Inphi Corporation, Santa Clara, CA (US)

(72) Inventors: Radhakrishnan L. Nagarajan, Santa Clara, CA (US); Peng-Chih Li, Santa Clara, CA (US); Masaki Kato, Palo Alto, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 14/789,290

(22) Filed: Jul. 1, 2015

(51) Int. Cl.
| | |
|---|---|
| H04B 10/00 | (2013.01) |
| G02B 6/12 | (2006.01) |
| H04B 10/40 | (2013.01) |
| H04J 14/02 | (2006.01) |
| H04B 10/516 | (2013.01) |

(52) U.S. Cl.
CPC ............ *H04B 10/40* (2013.01); *H04B 10/516* (2013.01); *H04J 14/02* (2013.01)

(58) Field of Classification Search
CPC .. H04B 10/40; H04B 10/516; G02B 6/4292; G02B 6/43; G02B 6/12004
USPC .................... 398/135, 140; 385/14
See application file for complete search history.

(56) References Cited

U.S. PATENT DOCUMENTS

| | | | |
|---|---|---|---|
| 7,171,081 B1* | 1/2007 | Ko .................... | G02B 6/29361 385/31 |
| 8,300,994 B2* | 10/2012 | Welch .................... | B82Y 20/00 385/14 |
| 2009/0297159 A1* | 12/2009 | Margolin ............. | G02B 6/4201 398/135 |
| 2015/0147062 A1* | 5/2015 | Otte .................... | H04B 10/506 398/79 |

* cited by examiner

*Primary Examiner* — Tesfaldet Bocure
(74) *Attorney, Agent, or Firm* — Richard T. Ogawa; Ogawa P.C.

(57) ABSTRACT

The apparatus includes a case having a base member, two partial side members, and a lid member to provide a spatial volume with an opening at a back end of the base member. Additionally, the apparatus includes a PCB installed inside the spatial volume over the base member with a pluggable connector at the back end. The apparatus includes one or more optical transmitting devices in transmit-optical-sub-assembly package, each being mounted upside-down on the PCB and including a built-in TEC module in contact with the lid member and a laser output port aiming toward the back end. Furthermore, the apparatus includes a silicon photonics chip including a fiber-to-silicon attachment module, mounted on the PCB and coupled to a modulation driver module and a trans-impedance-amplifier module. Moreover, the apparatus includes an optical input port and output port being back connected to the fiber-to-silicon attachment module.

22 Claims, 7 Drawing Sheets

PHOTONIC TRANSCEIVING DEVICE PACKAGE STRUCTURE

BACKGROUND OF THE INVENTION

The present disclosure is related to a photonic transceiver package structure, more particularly, to a silicon photonic transceiver package structure that conforms to the Quad Small Form-factor Pluggable (QSFP) specification adapted for multiple Thermoelectric Cooler-Transmitter Optical Sub-Assembly (TEC-TOSA) laser devices disposed upside down to heat sink away from a printed circuit board (PCB) with reversed orientation of laser output port relative to optical input/output port of the transceiver module.

As science and technology are progressing rapidly, processing speed and capacity of the computer increase correspondingly. The communication transmission or reception using the traditional cable is limited to bandwidth and transmission speed of the traditional cable, but the mass information transmission required in modern life causes the traditional communication transmission overload. To address such requirements, the optical fiber transmission system replaces the traditional communication transmission system gradually. The optical fiber transmission system does not have bandwidth limitation, and also has advantages of high speed transmission, long transmission distance, its material is impervious to electromagnetic waves. Therefore, the electronics industry performs research toward optical fiber transmission which will become the mainstream in the future. Said optical communication is a technology in that light waves function as signal carriers and transmitted between two nodes via the optical fiber. Field of optical communication can be divided into optical communication side and electric communication side according to transmission medium. By the optical transceiver, the received optical signal can be converted to an electrical signal capable of being processed by an IC, or the processed electrical signal can be converted to the optical signal to be transmitted via optical fiber. Therefore, objective of communication can be achieved.

Wavelength-division multiplexing (WDM) is a multitask technology of processing multiple optical carrier signals transmitted by the optical fiber, and this technology is applied on the different wavelength signal or transmission of laser optical source. This technology is implemented in both directions on the optical fiber to double total transmission capacity. Besides, the term "wavelength-division multiplexing" is mostly applied in optical carrier, and frequency-division multiplexing is applied in radio carrier. Moreover, both of wavelength and frequency are in reciprocal relationship, so their concept can be applied to each other.

Wavelength-division multiplexing is implemented by dividing the work wavelength of optical fiber into multiple channels to enable mass data transmission in one optical fiber. A whole wavelength-division multiplexing (WDM) system can be divided into a wavelength division multiplexer at transmitting end and a wavelength division demultiplexer at receiving end. At present, there are commercial wavelength division multiplexer/demultiplexer which can divide 80 or more channels in the optical fiber communication system, so that the data transmission speed can exceed grade of Tb/s effectively.

In both transmitting and receiving ends of the optical fiber communication system, the transmitting module adapted for WDM technology, the connector usually has single light transmitter structure. However, such light transmitter structure can emit optical signals with different frequencies, but cannot be repaired for individual frequency. Therefore, whole light transmitter must be replaced if being damaged, and it causes larger consumption in cost.

BRIEF SUMMARY OF THE INVENTION

The present disclosure is related to a photonic transceiver package structure, more particularly, to a silicon photonic transceiver package that conforms to the QSFP specification adapted with multiple TEC-TOSA laser devices disposed upside down to place heat sinks away from PCB and laid reversely in laser output port orientation relative to optical input/output port of the transceiver. In certain embodiments, the invention is applied for high bandwidth optical communication, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

Serial link performance is limited by the channel electrical bandwidth and the electronic components. In order to resolve the inter-symbol interference (ISI) problems caused by bandwidth limitations, we need to bring all electrical components as close as possible to reduce the distance or channel length among them. Stacking chips into so-called 3-D ICs promises a one-time boost in their capabilities, but it's very expensive. Another way to achieve this goal in this disclosure is to use multiple chip module technology.

In an example, an alternative method to increase the bandwidth is to move the optical devices close to electrical device. Silicon photonics is an important technology for moving optics closer to silicon. In this patent application, we will disclose a high speed electrical optics multiple chip module device to achieve terabits per second speed, as well as variations thereof.

In a specific embodiment, the present invention provides an apparatus for packaging a photonic transceiver. The apparatus includes a case, comprising a base member, two partial side members being connected by a joint piece and coupled to the base member, a lid member including a cover coupled to the two partial side members and the base member to provide a spatial volume with an opening at a back end of the base member. The apparatus further includes a PCB installed inside the spatial volume over the base member. The PCB includes a board body extended from a front edge to a back edge. The back edge is near the opening at a back end of the base member. The board body includes an array of metallic pin stripes at the back edge to form a pluggable electrical interface connector. Additionally, the apparatus includes one or more optical transmitting devices. Each of the one or more optical transmitting devices is mounted upside-down on the PCB near the front edge and includes a TEC module being in thermal contact with the lid member and a laser output port aiming toward the back edge. Furthermore, the apparatus includes a silicon photonics chip mounted on the PCB. The silicon photonics chip includes a fiber-to-silicon attachment module to couple with a first fiber from each of the laser output port. Moreover, the apparatus includes an optical input port and an optical output port disposed together on a front end of the base member near the joint piece for the two partial side members. Each optical input port and optical output port is back connected via a second fiber to the fiber-to-silicon attachment module.

Therefore, the present disclosure has at least following advantages. First, the package structure for the photonic transceiver of the present disclosure can be detached independently, so that assembly engineer can replace single photonic transceiver in failure. Secondly, the PCB board and cylindrical element of a transmitting device of the present disclosure can be detached and detected individually, so that the cylindrical element provided with the coupling lens can be recycled for reuse when the transmitting module is damaged. Thirdly, the reversed output orientation of the transmitting device relative to the transceiver output port provides easy access for the laser output fiber to couple with a silicon photonics chip on the PCB. Fourthly, the upside-down disposition of the transmitting laser device on PCB with its TEC base attached to the lid member away from the PCB, enhancing heat dissipation efficiency for the transmitting laser device.

The present invention achieves these benefits and others in the context of known memory technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

The present disclosure is related to a photonic transceiver package structure, more particularly, to a silicon photonic transceiver package structure in QSFP specification adapted with multiple TEC-TOSA laser devices disposed upside down to keep heat sinks away from PCB and laid reversely in orientation of laser output port relative to optical input/output port of the transceiver. In certain embodiments, the invention is applied for high bandwidth optical communication, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1A:
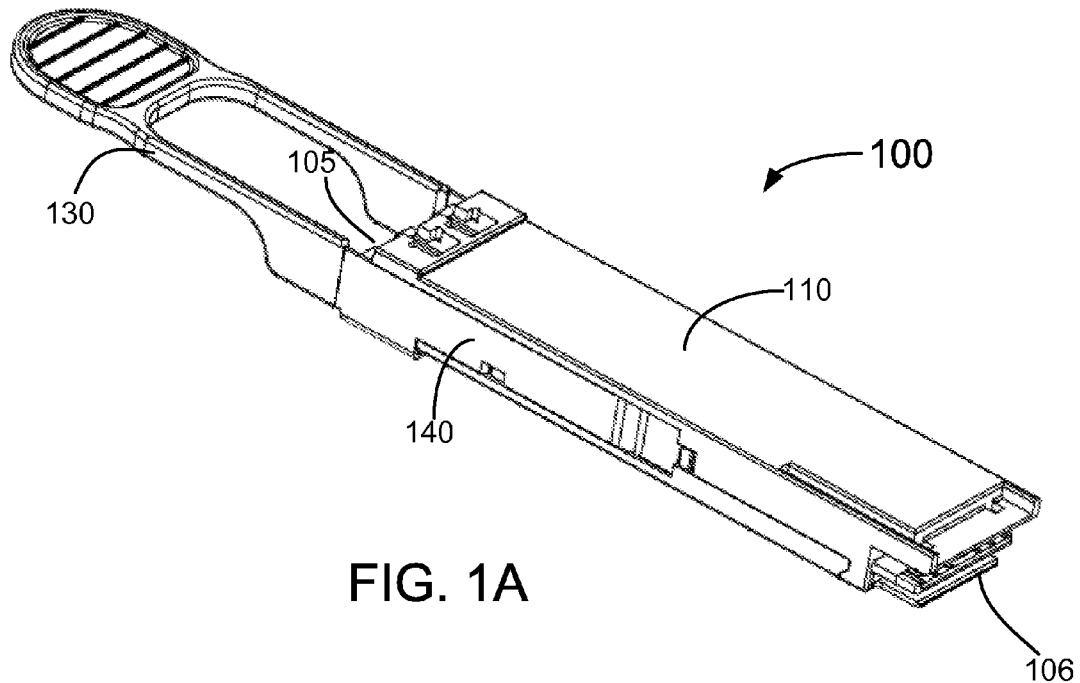
FIG. 1A is a perspective bottom view of a photonic transceiver package structure with lid according to an embodiment of the present invention.

FIG. 1A is a schematic bottom view of a photonic transceiver package structure with lid member according to an embodiment of the present invention. As shown, the photonic transceiver package structure is compatible with the Quad Small Form-factor Pluggable (QSFP) specification, which is designed for a compact small form factor, hot-pluggable photonic transceiver package 100 used for high speed data communications applications. Technically, the small form factor pluggable transceiver allows data rates of 4×10 Gbit/s, 4×28 Gbit/s or higher. A pull handle 130 is included at the front end 105 for easy handling of plugging or unplugging of the photonic transceiver package 100 (with a photonic transceiver installed within the package structure but not visible yet in this figure) into or out of a port of communication network system terminals such as routers, switches, and transport gear. At the same front end 105 of the QSFP package structure, two optical ports are disposed (one input and one output, not visible in FIG. 1A and will be shown later).

Figure 1B:
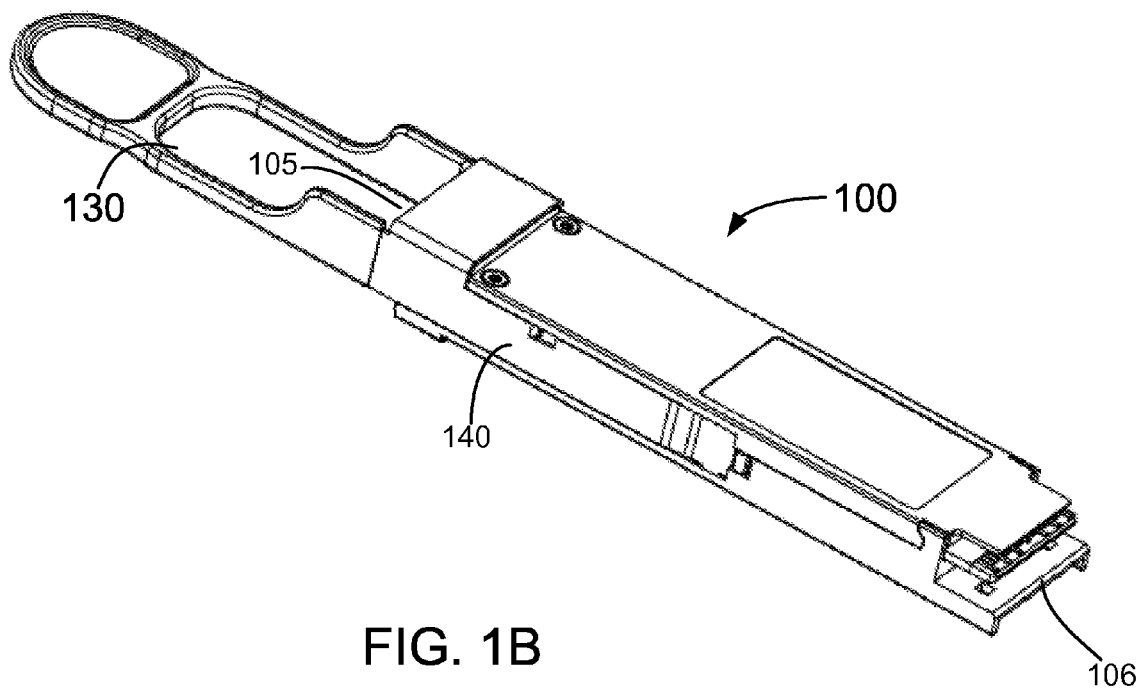
FIG. 1B is a perspective top view of a photonic transceiver package structure with lid according to the embodiment of the present invention.

FIG. 1B is a schematic top view of a photonic transceiver package structure with lid member according to the embodiment of the present invention. The top view shows a removable lid member 110 still been placed by coupling with the side members 140 of the QSFP package structure 100. The electrical connection on a PCB is barely visible at the back end 106 of the QSFP package structure 100 for connecting with system terminals via a simple plug-in operation.

Figure 2A:
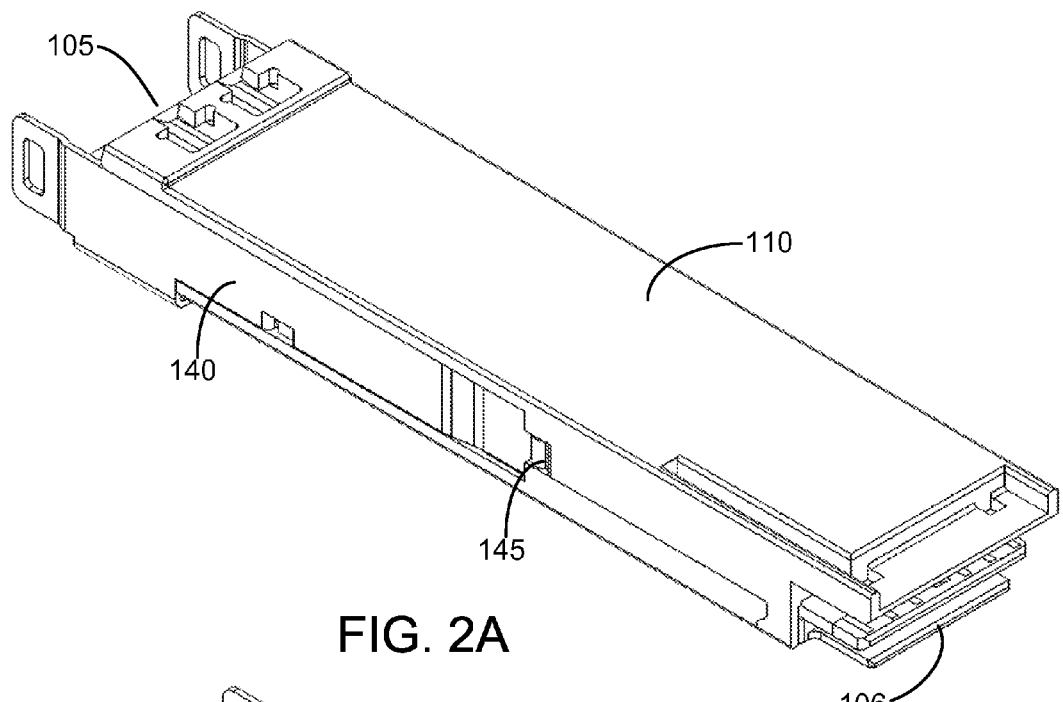
FIG. 2A is a perspective top view of a photonic transceiver package structure without a pull handle but with lid member according to the embodiment of the present invention.
Figure 2B:
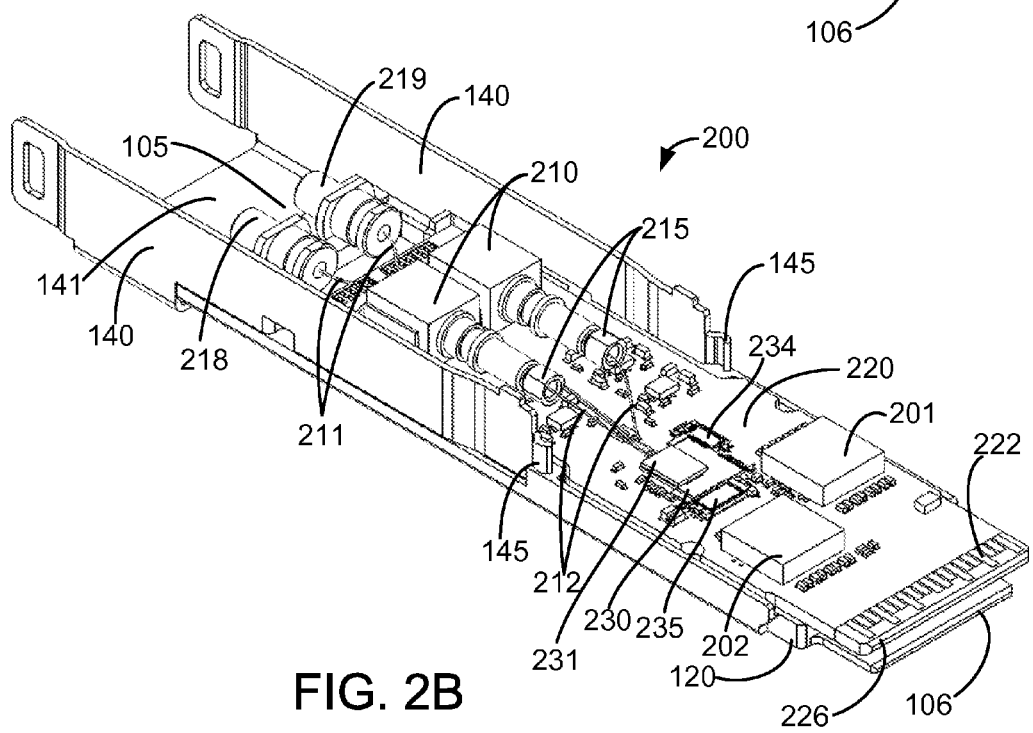
FIG. 2B is a perspective top view of a photonic transceiver package structure without lid member according to the embodiment of the present invention.

FIG. 2A is a schematic top view of a photonic transceiver package structure with a lid member in position according to the embodiment of the present invention. This diagram is merely an example, which should not unduly limit the scope of the claims. One of ordinary skill in the art would recognize many variations, alternatives, and modifications. The pull handle has been removed from the package structure. FIG. 2B is a schematic top view of a photonic transceiver package structure without the pull handle and lid member according to the embodiment of the present invention. This diagram is merely an example, which should not unduly limit the scope of the claims. One of ordinary skill in the art would recognize many variations, alternatives, and modifications. As shown, the lid member 110 has been removed from a clip structure 145 on the side member 140 to reveal the layout of a photonic transceiver 200 inside the package structure 100. In an embodiment, the side member 140 has two vertical pieces coupled to side edges of a base member 120. The two vertical pieces 140 are connected by a horizontal joint piece 141 leveled with the base member 120. The joint piece 141 is located near a front end of the base member 120. In another embodiment, the lid member 110 includes a cover and a pair of partial side pieces to couple with the base member 120 to provide a space volume that can hold the photonic transceiver 200 therein, which is revealed in FIG. 2B, while leaving an opening at a back end 106 of the base member 120.

As shown in FIG. 2B, the photonic transceiver 200 includes a pair of optical ports 218, 219 and a PCB 220 mounted on the base member. One optical port 218 is designed as an optical input port for the transceiver 200 and another port 219 is an optical output port. Both optical ports are disposed in parallel along length direction near a front end region of the base member 120, just recessed from the horizontal joint piece 141 for the side member 140. The front side of the optical input port 218 and optical output port 219 are respective part of two optical connectors suitable in the industry. For example, a paired multi-fiber push on (MPO) or LC connector can be used, one fiber for the optical input port 218 and another fiber for the optical output port 219. The back side of each port is connected by an optical fiber 211 for internal connection inside the package structure 100 of the photonic transceiver 200. The PCB 220 is located a short distance away from the optical input port 218 and optical output port 219 and extended toward the back end 106 of the base member 120 of the photonic transceiver package structure 100.

Referring to FIG. 2B, additionally, several elements for the photonic transceiver 200 are mounted on the PCB 220. First of all, a pair of transmitting devices 210 is mounted near the front part of the PCB 220. In an alternative embodiment, more than two such devices can be optionally installed. In a specific embodiment, each transmitting device 210 is a laser device, or particular here is a TEC-TOSA laser device. As shown, each TEC-TOSA laser device 210 is installed with its laser output port orientated in opposite direction of the optical input/output port 218/219 so that each laser output port has a fiber 212 coming out towards the back end 106. The fiber 211 from the optical input/output ports 218/219 is laid under the transmitting device 210. Both fiber 212 and fiber 211 are then configured to couple with a fiber-to-silicon attachment module 231 of a silicon photonics chip 230 which is mounted in the middle of the PCB 220. The silicon photonics chip 230 is coupled to two modules, a driver module 234 and a TIA (trans-impedance amplifier) module 235 for independently processing electrical/optical signals of the photonic transceiver 200. Furthermore, two ASIC chips 201 and 202 are mounted on the PCB 220 near the back edge 226 to control electrical interface for communication with network system via multiple metallic pin stripes 222 disposed at the back edge 226 of the PCB 220, which will be accessible for plugging into a system apparatus through the opening near the back end 106 of the photonic transceiver package 100 when the lid member 110 is placed back.

Figure 3:
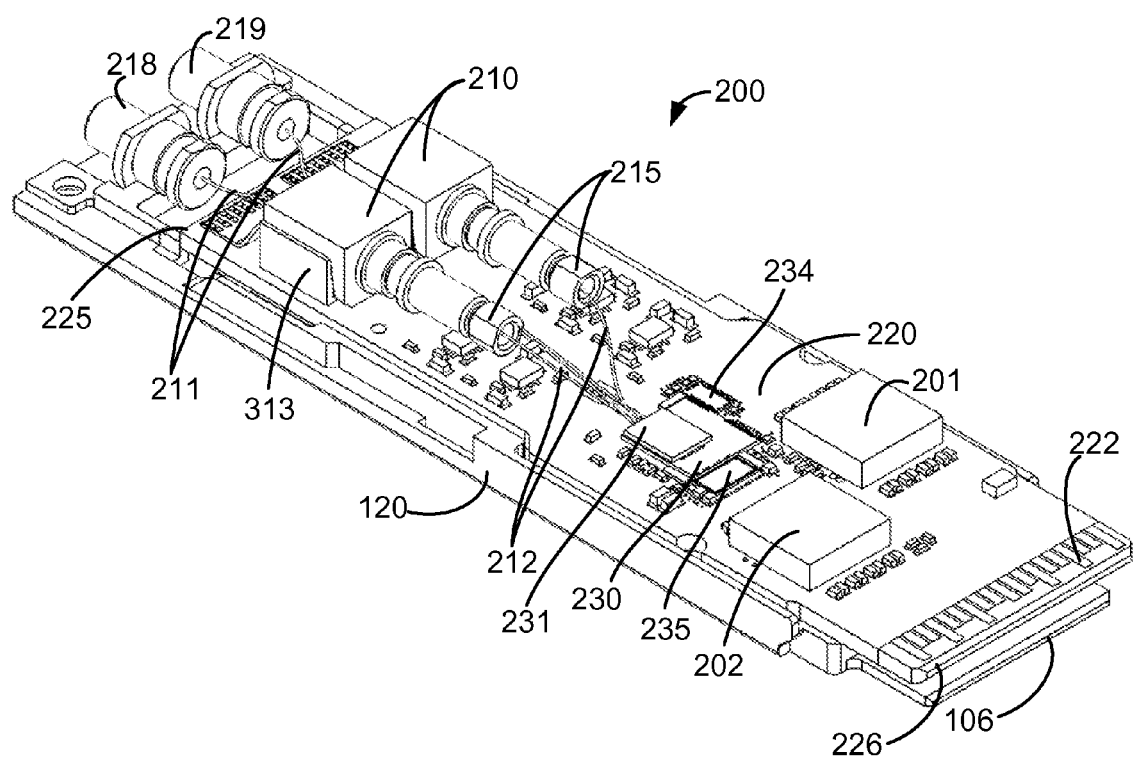
FIG. 3 is a perspective top view of a photonic transceiver on a circuit board according to the embodiment of the present invention.

FIG. 3 is a schematic top view of a photonic transceiver without the pull handle, lid member, and side members of the package structure according to the embodiment of the present invention. This diagram is merely an example, which should not unduly limit the scope of the claims. One of ordinary skill in the art would recognize many variations, alternatives, and modifications. As shown, the pull handle 130 and side members 140 are also removed from a base member 120 of the photonic transceiver package. PCB 220 and a pair of optical input and output ports 218, 219 for the photonic transceiver 200 are disposed on the base member 120.

In an embodiment, the photonic transceiver 200 includes one or more transmitting devices 210 installed on the PCB 220 near the front edge 225. In a specific embodiment, each of the transmitting devices 210 is a TEC-TOSA (thermoelectric cooled transmit optical sub-assembly) laser device. Each TEC-TOSA laser device 210 is configured (via a transmitting module inside) to produce one laser light at a specific wavelength outputted through a laser output port 215 with a single-mode fiber 212 and is coupled into a fiber-to-silicon photonics attachment module 231 pre-fabricated on the silicon photonics chip 230 which is mounted on the middle region of PCB 220. The fiber-to-silicon photonics attachment module 231 includes multiple V-grooves for coupling the optical fibers with silicon waveguides (not visible in FIG. 3) through which the light received externally can be directly guided to a Mach-Zehnder (MZ) modulator per channel (not visible in FIG. 3) capable of operating under PAM4 and NRZ protocol. In other words, this silicon photonics chip 230 is, contrary to some conventional photonics chips with internal laser diodes (LD), configured to receive light signal from external optical sources which are just the two TEC-TOSA laser devices 210 in the implementation of the present invention as shown in FIG. 3. This chip and package design make the manufacture of the silicon photonics chip 230 independent from any tuning process of the laser devices, thereby enhancing the robustness and reliability of the whole QSFP transceiver package.

In a specific embodiment, there can be at least two TEC-TOSA laser devices 210 in each QSFP package 100, which needs two MZ modulators correspondingly for the two channels of wavelengths of laser light. As mentioned in FIG. 2B, the silicon photonics chip 230 is coupled to the modulation driver module 234 by wire bonding. The driver module 234 is a two-channel silicon-germanium modulator driver for driving each of the two MZ modulators to modulate corresponding channels of laser light with different wavelengths into a desired optical signal. In a specific embodiment, after modulation, multiple lights with different wavelengths from the two or more TEC-TOSA laser devices 210 are multiplexed and outputted via the fiber-to-silicon attachment module 231 again to a single optical fiber 211 connected to optical output port 219 (with a LC or MPO connector) of the photonic transceiver 200.

On the other hand, the photonic transceiver device 200 is configured to receive optical signal via optical input port 218 which is passed through a single fiber 211 to the silicon photonics chip 230 first via the fiber-to-silicon attachment module 231. Then a demultiplexer (not visible in FIG. 3 but built in the silicon photonics chip 230) transforms it into different channels of light with different wavelengths being detected by one or more PDs (Photo Diodes) (not visible in FIG. 3) therein. Each light signal associated with a specific wavelength is converted into an electrical signal and further processed to a digital signal at least by the TIA module 235. Also mounted on the PCB 220 near the back edge 226 includes two port interface ASIC chips 201, 202 based on CMOS technology. One ASIC chip 201 is configured for electrical Tx module with 4×10G (total of 40 Gbit/s) XLAUI (40 Gigabit Attachment Unit Interface) electrical interface for connecting to Ethernet and 4×25G (total of 100 Gbit/s) CAUI (100 Gigabit Attachment Unit Interface) electrical interface, through which electrical signal can be transmitted out to Ethernet network via multiple metallic pin stripes 222 disposed as a pluggable electrical connector at the back edge 226 of the PCB 220. Another one ASIC chip 202 is configured for electrical Rx module with similar interfaces for receiving electrical signals from Ethernet network.

In a specific embodiment, the silicon photonics chip 230 is coupled to a PAM4 driver module 234 for driving two MZ modulators (single stage or multi-stage) for providing optical signal modulation. The PAM4 driver module 234 includes a PAM encoder and a FEC encoder with CDR Rx I2C interface coupled to ASIC chip 201 for converting data to optical signal in 4×10G to 4×25G rate. The PAM4 driver module 234 is based on 28 nm CMOS technology. Additionally, the silicon photonics chip 230 is also coupled to a TIA module 235 for processing electrical signals and converting them to digital signals. The electrical signals are converted by one or more PDs from demultiplexed light signals out of an incoming optical signal received from the optical input port 218. The TIA module 235, also based on 28 nm CMOS technology, includes PAM ADC/DSP CDR and PAM decoder with CDR Tx interface coupled to ASIC chip 202 for converting optical signal to digital signal in 4×10G to 4×25G rate for converting optical signal to digital signal in 4×10G to 4×25G rate and provide electrical interface communication with Ethernet network via the pluggable multiple metallic pin stripes 222.

In a specific embodiment, the TEC-TOSA laser device 210 is laid in a reversed configuration with laser output port 215 pointing toward the back edge 226 of the PCB 220, just opposite to that of the conventional transceiver device whose laser output port is pointed to the optical fiber output port 219 (with a LC connector) near the front end 105 of the photonic transceiver package 100 (see FIG. 1B). Such reversed configuration allows the built-in fiber-to-silicon photonics attachment module 231 on the silicon photonics chip 230 to directly face the laser output port 215 for properly coupling each fiber 212 to the silicon photonics chip 230. The silicon photonics chip 230 itself can be disposed closer to the ASIC chips 201/202 near the back edge 226 of the PCB 220 for simplification of circuit board wire bonding.

In another specific embodiment, shown in FIG. 3, each TEC-TOSA laser device 210 is disposed in upside-down fashion compared to conventional package. In this upside-down package, the TEC-TOSA laser device 210 includes a cover member 313 disposed to the bottom side resting on the PCB and a TEC base with a flat surface region facing upward in FIG. 3. The TEC base is used for directly mounting a TEC module for cooling corresponding laser chip inside the TEC-TOSA laser device 210. The flat surface region (as seen in FIG. 3) of the TEC base is then configured to be in thermal contact (possibly via a submount pad or other medium) with the lid member 110 when the transceiver QSFP package structure 100 is completely assembled. Usually, any external heat sink (not shown) is attached with the lid member 110. The thermal contact formed directly between the flat surface of the TEC base with the lid member in above package structure provides a direct pathway for efficient heat dissipation from the laser chip to an external heat sink for maintaining stable wavelength of the output laser light.

In yet another specific embodiment, the photonic transceiver 200 in this embodiment applies technology of wavelength-division multiplexing (WDM), two or more TEC-TOSA laser devices 210 to use a Distributed Feedback Fabry-Perot (DFB FP) laser diode to generate laser light of different wavelengths at any channels of dense-wavelength-division-multiplexing spectrum band. Two channels can further be combined into one single-mode optical fiber via wavelength-division multiplexer for middle distance and long distance transmission. Next, the received optical signal is performed a light-split process by the demultiplexer and the split optical signals are introduced to different channels. In this embodiment, except WDM technology, the photonic transceiver package 100 also can be applied to related optical communication technologies, such as binary phase shift keying modulation (BPSK), quadrature phase shift keying modulation (QPSK), conventional/coarse wavelength division multiplexing (CWDM), dense wavelength division multiplexing (DWDM), and optical add/drop multiplexer (OADM), reconfigurable optical add/drop multiplexer (ROADM).

Figure 4:
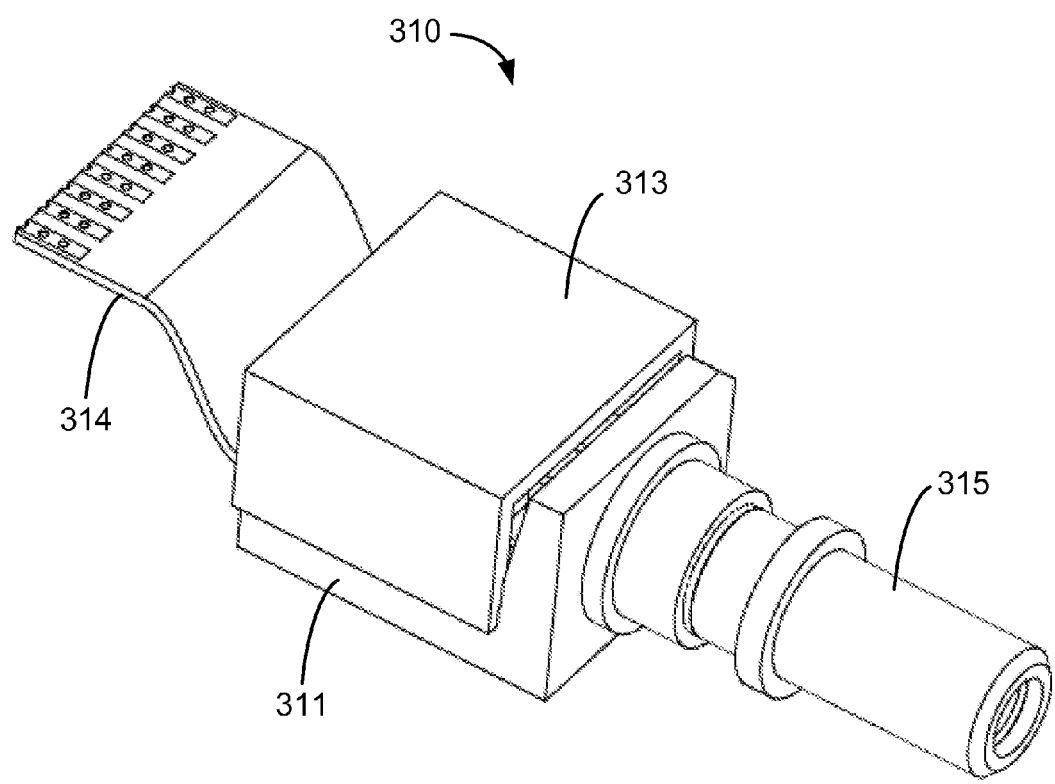
FIG. 4 is a perspective bottom view of a TEC-TOSA laser device for the photonic transceiver according to the embodiment of the present invention.

FIG. 4 is a perspective bottom view of a TEC-TOSA laser device for the photonic transceiver according to the embodiment of the present invention. This diagram is merely an example, which should not unduly limit the scope of the claims. One of ordinary skill in the art would recognize many variations, alternatives, and modifications. As shown, TEC-TOSA laser device 310 includes a TEC base 311 for supporting a TEC module and a transmitting module (both are not directly visible in FIG. 4), a cover 313 covering above the transmitting module, a curved circuit board 314 disposed at one side of the TEC base 311, and a cylindrical element 315 mounted at another side of the TEC base 311. The TEC module is designed for keeping the wavelength of laser light generated by the FP laser diode stabilized during any environmental temperature changes. The TEC base 311 is made of metal material and can assist the transmitting module to dissipate heat.

Figure 5:
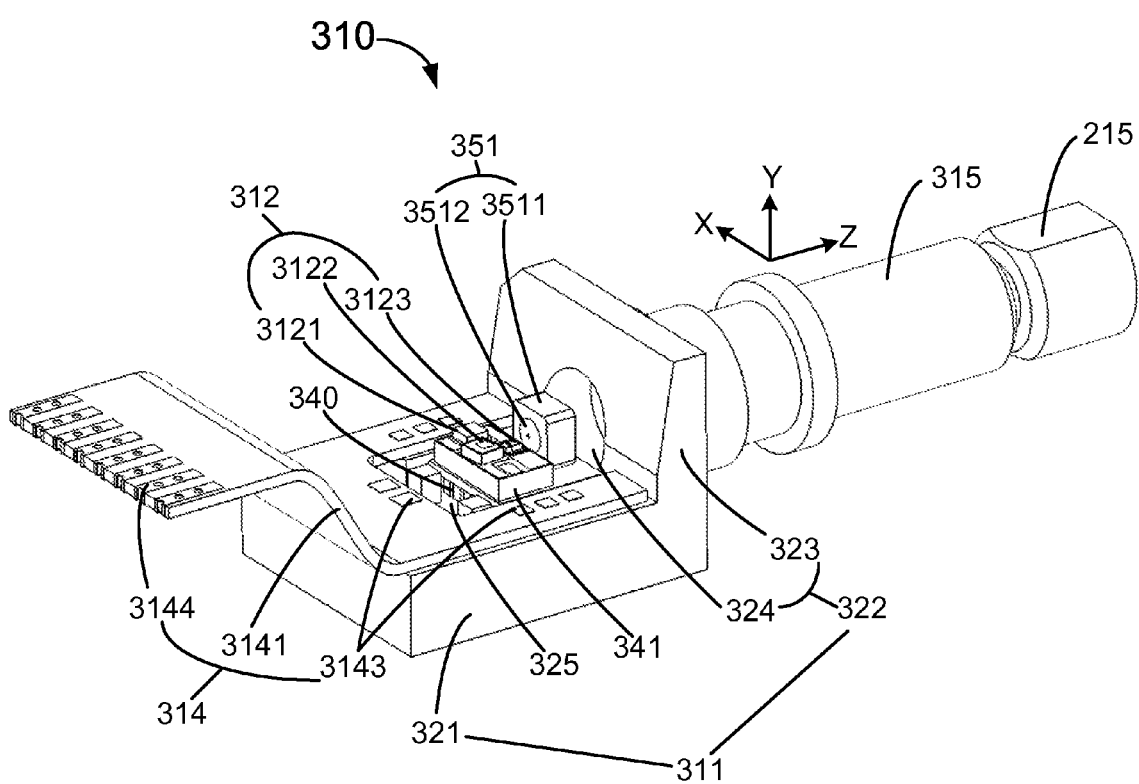
FIG. 5 is a perspective view of a TEC-TOSA laser device for the photonic transceiver without cover according to the embodiment of the present invention.

FIG. 5 is a perspective view of the TEC-TOSA laser device for the photonic transceiver without cover according to the embodiment of the present invention. This diagram is merely an example, which should not unduly limit the scope of the claims. One of ordinary skill in the art would recognize many variations, alternatives, and modifications. As shown, with the cover 313 being removed, the TEC base 311 is substantially visible with a plane part 321, and an assembling part 322 disposed on one end the plane part 321. The plane part 321 includes a hollow region 325 for holding a TEC module 340 on which a submount 341 is placed. One end of the flex circuit board 314 is integrated with the TEC base 311 and bended in the middle region to have other end to be leveled at a different height for mounting with connection spots on the PCB 220 (as the laser device 310 is mounted in upside-down configuration on the PCB 220).

Referring to FIG. 5, further, the transmitting module 312 comprises a thermistor 3121, a monitor photo diode (MPD) chip 3122, a DFB FP laser diode (LD) chip 3123 disposed on the submount 341. The assembling part 322 comprises a vertical portion 323 disposed at the end of the plane part 321. An annular hole 324 is disposed inside the vertical portion 323 and corresponds to the transmitting module 312. The annular hole 324 is disposed correspondingly to allow the coupling lens assembly 351 aligned the LD chip 3123 of the transmitting module 312 for coupling laser light therethrough along a central line into the cylindrical element 315. The coupling lens assembly 351 comprises a square metal outer part 3511 fixed on a flat surface of the TEC module 340 in front of the annular hole 324, holding a lens body 3512. The lens body 3512 comprises an aspherical lens with curved surfaces on both sides having radius of curvature changes according to distance from the optical axis for achieving improved laser light coupling efficiency. During manufacturing process, filler material is sealed into a space over the transmitting module 312 between the cover 313 (see FIG. 4 and it is removed in FIG. 5 with upside-down view) and the plane part 321 of the TEC base 311 by infusion or welding, in order to achieve the objective of sealing the transmitting module 312. The structure of the cylindrical element 315 will be described in detail in following content.

Referring to FIG. 5 again, the flex circuit board 314 comprises a board body 3141 bended in the middle region with a U-shaped end formed with multiple electrical connection spots 3143 and a flat end, opposite to the U-shaped end, formed with electrical connection stripes 3144. The U-shaped end is fixed on the plane part 321 of the TEC base 311 by epoxy gluing. The transmitting module 312 and TEC module 340 are connected electrically to the electrical connection spots 3143 of the flex circuit board 314 by wire bonding, spot welding or conductive epoxy. The flat end with electrical connection stripes 3144 is used for mounting on to the printing circuits in the PCB 220 near the front edge 225 by electrical welding, spot welding or slot connection, so as to transmit the excitation signal from the signal process module on the PCB 220 to the transmitting module 312.

The cylindrical element 315 of the laser device 310 is mounted on the assembling part 322 correspondingly connecting to the laser output port 215 (with the optical fiber 212 as shown in FIG. 3 but the fiber is not visible in FIG. 5). In this embodiment, the coupling lens assembly 351 is disposed at one end of the cylindrical element 315 and the cylindrical element 315 is configured to adjust its parts in both X-Y plane and Z-space so as to properly couple the laser light emitted from the transmitting module 312 through the cylindrical element 315 and to output from laser output port 215 to the optical fiber 212.

Figure 6:
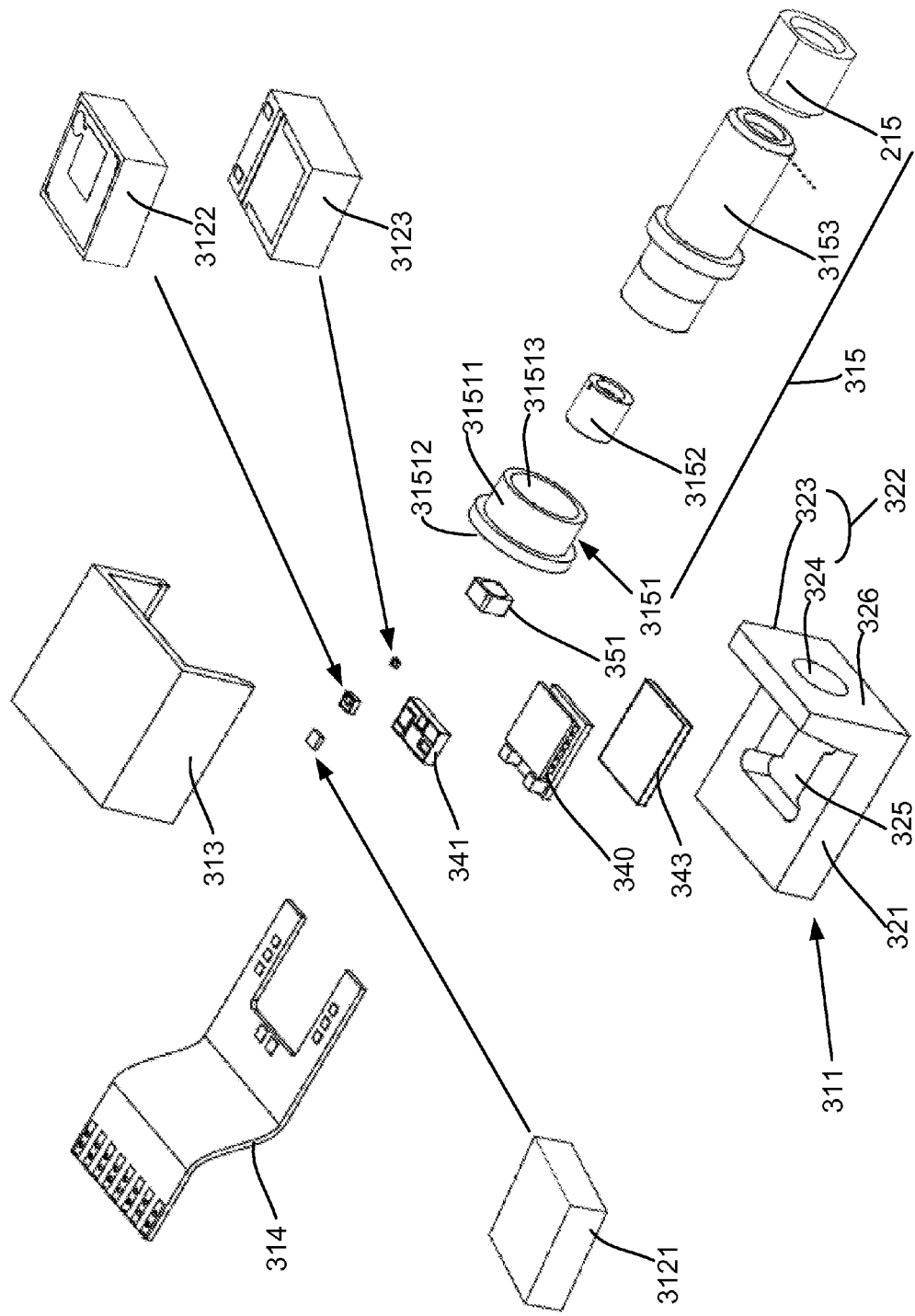
FIG. 6 is an exploded view of the TEC-TOSA laser device according to an embodiment of the present invention.

FIG. 6 is an exploded view of the TEC-TOSA laser device according to an embodiment of the present invention. This diagram is merely an example, which should not unduly limit the scope of the claims. One of ordinary skill in the art would recognize many variations, alternatives, and modifications. As shown, the cylindrical element 315 of the laser device 310 can be disassembled into a Z-space member 3151 with plane adjusting mechanism, an isolator 3152, a cylindrical receptacle member 3153 with light distance adjusting mechanism together with optical fiber connection mechanism, arranged in order from left to right. The isolator 3152, when being assembled, shall be in an axial location surrounded mainly by the Z-space member 3151 and at least partially by the cylindrical receptacle member 3153. The optical fiber connection mechanism is configured to include a fiber ferrule ring 215 for holding the single mode fiber 212 as seen in FIG. 3. The components of the transmitting module 312 including the thermistor 3121, the MPD (monitor photodiode) chip 3122, and the LD chip 3123 are respectively shown with enlarged view and are all mounted on the submount 341. The TEC module 340 actually is sandwiched by the submount 341 on top and another submount 342 at bottom to provide heat dissipation for the transmitting module 312. The submount 342 is leveled with an outer surface of the plane part 321 of TEC base 311 for proper contacting with the lid member 110. All the parts of the TEC module plus two submounts and the transmitting module will be disposed in the hollow region 325 of the plane part 321 of the TEC base 311.

Figure 7:
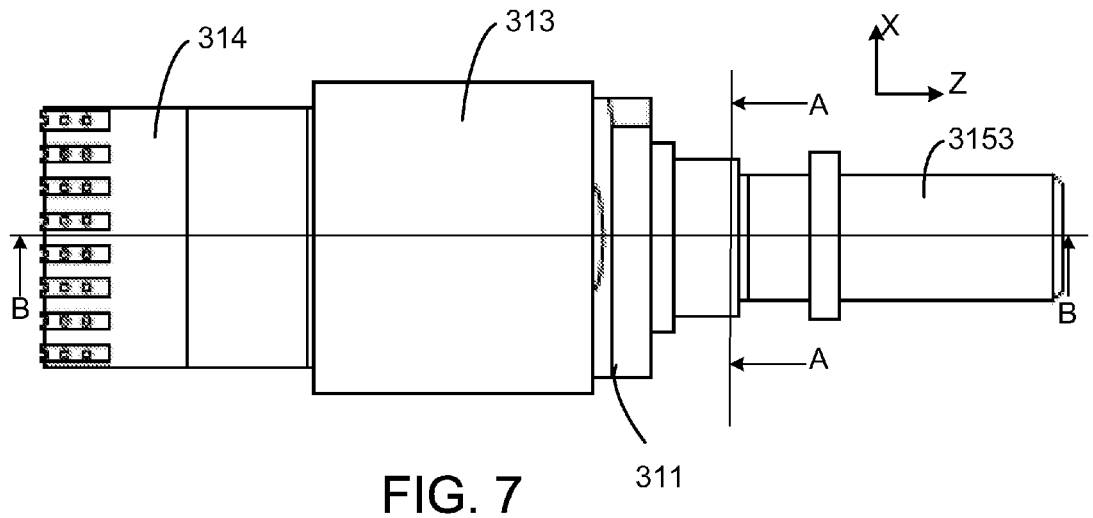
FIG. 7 is a top view of the TEC-TOSA laser device according to an embodiment of the present invention.
Figure 8:
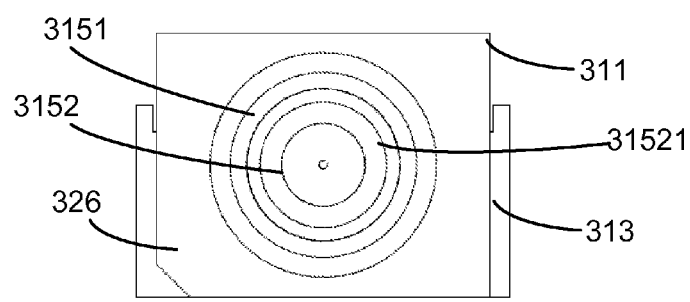
FIG. 8 is a cross-section view of the TEC-TOSA laser device of FIG. 7 along line A-A according to the embodiment of the present invention.

FIG. 7 is a top view of the TEC-TOSA laser device according to an embodiment of the present invention. FIG. 8 is a cross-section view of the TEC-TOSA laser device of FIG. 7 along line A-A according to the embodiment of the present invention. Please refer to FIG. 4 through FIG. 8 for detail structure of the TEC-TOSA laser device 310. As shown in FIG. 6 and FIG. 7, the Z-space member 3151 is integrated on the assembling part 322 by welding after coupling calibration is completed, and space between the Z-space member 3151 and the assembling part 322 is sealed by infusing filler. For X-Y plane calibration, the assembling part 322 of the TEC base 311 comprises a first connection plane 326 disposed at one side of the vertical portion 323. The Z-space member 3151 comprises a tubular body 31511 and second connection plane 31512 disposed at one side of the tubular body 31511. The second connection plane 31512 corresponds to the first connection plane 326. During calibration, a calibration device is used to adjust the relative position between the Z-space member 3151 and the assembling part 322 to align the tubular body 31511 with the annular hole 324 of the assembly part 322. After the calibration is done, the first connection plane 326 is fixed on the second connection plane 31512 by laser spot welding, and then X-Y plane calibration is completed.

Further shown in FIG. 6, the cylindrical receptacle member 3153 with the light distance adjusting mechanism is integrated onto the Z-space member 3151 by welding after the coupling calibration is completed, and the space between them is sealed by infusing filler. For Z-axis calibration, in the Z-space member 3151 includes a groove track (not shown) disposed at the disposal slot 31513 at one side of the body 31511 opposite to the second connection plane 31512. The disposal slot 31513 is for inserting a coupling portion 31531 of the cylindrical receptacle member 3153. The coupling portion 31531 is movable along the groove track. The coupling portion 31531 further includes an inner disposal slot 31533 for holding the isolator 3152 and a recessed outer disposal ring 31532 for engaging with the cylindrical receptacle member 3153. After the isolator 3152 is installed and Z-axis calibration is completed, the coupling portion 31531 is fixed to the Z-space member 3151 by laser welding or other welding methods. The cylindrical receptacle member 3153 further includes a sleeve body 31534 for being engaged with the recessed outer disposal ring 31532 of the coupling portion 31531 and an optical fiber coupling channel 31535 inserted in the axial position.

Figure 9:
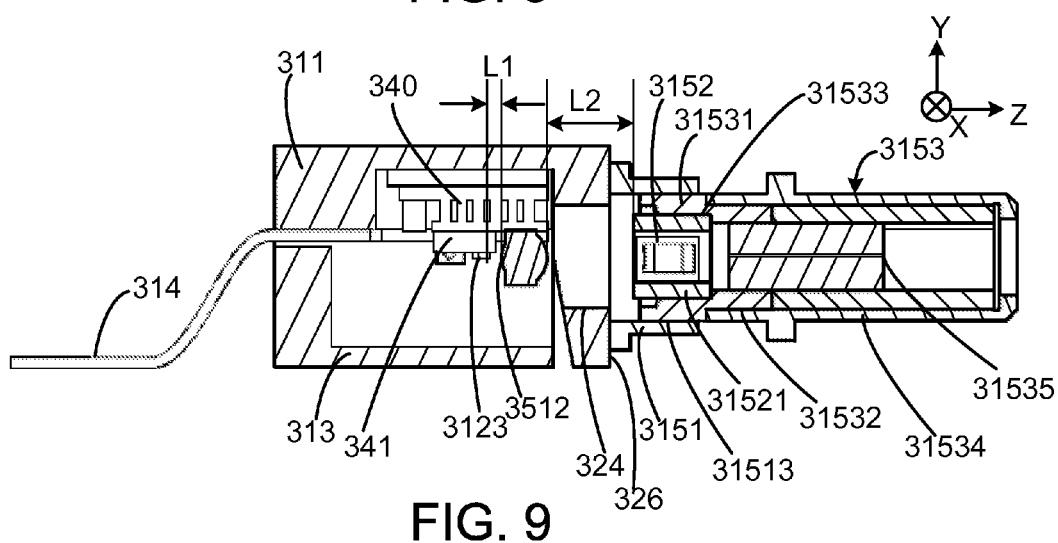
FIG. 9 is a cross-section view of the TEC-TOSA laser device of FIG. 7 along line B-B according to the embodiment of the present invention.

FIG. 9 is a cross-section view of the TEC-TOSA laser device of FIG. 7 along line B-B according to a specific embodiment of the present invention. Referring FIG. 9 and FIG. 6, the Z-axis calibration is easily illustrated. As shown, a distance from the LD chip 3123 of the transmitting module 312 to the lens body 3512 is defined as L1, and a distance from the lens body 3512 to the isolator 3152 is defined as L2. In this embodiment, the lens body 3512 (wrapped by the outer part 3511) is disposed directly on a flat (cold side) surface of the TEC module 340 in front of the annular hole 324. The distance L1 from the LD chip 3123 to the lens body 3512 is a fixed value adapted to the curvature of the aspherical lens for achieving optimal optical coupling of the emitted laser light from LD chip 3123 before curing the epoxy for bonding the outer part 3511 on the flat surface of the TEC module 340. But the distance L2 from the lens body 3512 to the isolator 3152 is adjusted according to the cylindrical receptacle member 3153 and the isolator 3152 moving along the groove track of the Z-space member 3151. As L1 is fixed, for better coupling efficiency, length of L2 tends towards a fixed value due to convergence characteristic of the lens body 3512. Therefore, the length of L2 depends on the length of L1. For biconvex lens, such configuration may increase the tolerance between the cylindrical receptacle member 3153 and the Z-space member 3151 since L2>L1, so that difficulty in process can be reduced.

Further in a specific embodiment, the isolator 3152 is disposed in a mechanical body 31521 (FIG. 8 and FIG. 9). The isolator body 31521 is inserted into the inner disposal slot 31533 of the coupling portion 31531 which is inserted into the disposal slot 31513 of the Z-space member 3151 (see FIG. 9). The isolator 3152 can be also disposed to connect one side of the external optical fiber, but it is not limited thereto. The optical fiber connection mechanism associated with the cylindrical receptor member 3153 is formed with the light coupling channel 31535 disposed along axial direction. One end of the light coupling channel 31542 is configured to couple with a fiber ferrule (215) for connecting an external optical fiber 212 correspondingly.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An apparatus for packaging a photonic transceiver comprising:
a case, comprising a base member, two partial side members being connected by a joint piece and coupled to the base member, a lid member including a cover coupled to the two partial side members and the base member to provide a spatial volume with an opening at a back end of the base member;
a PCB, installed inside the spatial volume over the base member, including a board body extended from a front edge to a back edge, the back edge being near the opening at an back end of the base member, the board body comprising an array of metallic pin stripes at the back edge to form a pluggable electrical interface connector;
one or more optical transmitting devices, each being mounted upside-down on the PCB near the front edge and including a TEC module being in thermal contact with the lid member and a laser output port aiming toward the back edge;
a silicon photonics chip, mounted on the PCB, including a fiber-to-silicon attachment module to couple with a first fiber from each of the laser output port, and
an optical input port and an optical output port disposed together on a front end of the base member near the joint piece for the two partial side members and respectively back connected via a pair of second fibers to the fiber-to-silicon attachment module.

2. The apparatus of claim 1 wherein each of the optical input port and the optical output port comprises a LC connector accessible from the front end by an optical fiber in a mate LC connector.

3. The apparatus of claim 1 wherein the optical input port and the optical output port are configured to fit a multi-fiber push-on (MPO) connector accessible from the front end by two optical fibers.

4. The apparatus of claim 1 wherein the optical transmitting device comprises a transmitting module, a TEC module, and a coupling lens assembly, the transmitting module being mounted on the TEC module via a first submount and the coupling lens assembly being directly mounted on the TEC module next to the transmitting module, all being enclosed in a space by a TEC base member and a cover member.

5. The apparatus of claim 4 wherein the TEC base member comprises a plane part having a hollow region formed from a top surface to a bottom surface for disposing a second submount on which the TEC module is mounted, the second submount being leveled with the bottom surface of the plane part and the first submount on the TEC module being above the top surface of the plane part.

6. The apparatus of claim 5 wherein the optical transmitting device comprises a circuit board having a flat end with electrical pins for coupling with connection spots on the PCB and a U-shaped end with electrical connection spots for mounting on the top surface of the plane part of the TEC base member.

7. The apparatus of claim 6 wherein the transmitting module comprises a thermistor, a MPD (monitor photodiode) chip, and a LD (laser diode) chip, all being mounted on the first submount attached on the TEC module and being respectively wire bonded to the electrical connection spots in the U-shaped end of the circuit board on the top surface of the plane part.

8. The apparatus of claim 7 wherein the TEC base member further comprises an assembly part substantially vertically connected to both the top surface and the bottom surface of the plane part, the assembly part having an annular hole disposed to align with the coupling lens assembly mounted on the TEC module at a predetermined distance from the LD chip.

9. The apparatus of claim 4 wherein the optical transmitting device comprises a filler material sealed the space by infusion and welding.

10. The apparatus of claim 8 wherein the optical transmitting device comprises a Z-space member having one end fixed to the assembly part at side opposite to the plane part with an alignment to the annular hole and another end coupled with a cylindrical receptor element, the Z-space member being configured to calibrate X-Y positions relative to the annular hole before being fixed.

11. The apparatus of claim 10 wherein the optical transmitting device further comprises an isolator fixed inside a sleeve body between the Z-space member and the cylindrical receptor element subjecting to a Z-axis calibration to determine an optimal distance of the isolator from the coupling lens assembly and an optical fiber connection mechanism coupled a fiber through the cylindrical receptor member and a ferrule.

12. The apparatus of claim 1 wherein the silicon photonics chip comprises one or more silicon-based MZ (Mach Zehnder) modulators, a plurality of photo diode detectors, a wavelength-division multiplexer, and a wavelength-division demultiplexer, the one or more silicon-based MZ modulators modulating light of different wavelengths received via the fiber-to-silicon attachment module from respective laser output ports of the multiple optical transmitting devices, the wavelength-division multiplexer being coupled to the multiple silicon-based linear MZ modulators to combine the light of different wavelengths after modulation before outputting via the fiber-to-silicon attachment module to the optical output port, and the wavelength-division demultiplexer being coupled to the fiber-to-silicon attachment module to demultiplex an optical signal from the optical input port to a light with multiple wavelengths respectively detected by the plurality of photo diode detectors.

13. The apparatus of claim 1 further comprising a pair of ASIC chips mounted on the PCB near the back edge respectively coupled with a modulation driver module and a TIA module, both being wire bonded to the silicon photonics chip.

14. The apparatus of claim 13 wherein the modulation driver module is based on CMOS technology including a PAM encoder and a FEC encoder with 2 channels CDR Rx I2C interface to drive the one or more silicon-based MZ modulators for modulating light from the one or more optical transmitting devices.

15. The apparatus of claim 13 wherein the TIA module is based on CMOS technology including PAM ADC/DSP CDR and PAM decoder with 2 channels CDR Tx interface to provide electrical interface communication with Ethernet network via the pluggable electrical interface connector.

16. The apparatus of claim 1 wherein the one or more optical transmitting devices include two laser devices in a TEC-based transmit optical sub-assembly package.

17. The apparatus of claim 1 further comprising a QSFP specification pluggable to network system allowing data rates of 4×10 Gbit/s, 4×28 Gbit/s or higher.

18. The apparatus of claim 7 wherein the LD chip comprises a FP photo diode with DFB package capable of producing a laser light with wavelength in one of DWDM spectrum channels.

19. The apparatus of claim 1 wherein the one or more optical transmitting devices are reversely laid on the PCB such that the laser output ports are aiming backward from the optical input port and the optical output port.

20. The apparatus of claim 1 wherein the fiber-to-silicon attachment module comprises multiple V-grooves fabricated on the silicon photonics chip for coupling optical fibers to silicon waveguides.

21. The apparatus of claim 1 wherein the silicon photonics chip is configured to receive one or more light signals externally from the one or more optical transmitting devices via the fiber-to-silicon attachment module coupled with the first fiber from each laser output port.

22. The apparatus of claim 7 wherein the TEC module being contacted with the lid member comprises a direct pathway for dissipating heat via the second submount to any external heat sink attached to the lid member.

* * * * *